March 14, 1961 P. RAPPAPORT ET AL 2,975,286
RADIATION DETECTION
Filed Dec. 26, 1957

INVENTOR.
PAUL RAPPAPORT &
JOSEPH J. LOFERSKI
BY
ATTORNEY

United States Patent Office 2,975,286
Patented Mar. 14, 1961

2,975,286

RADIATION DETECTION

Paul Rappaport, Princeton, and Joseph J. Loferski, Hamilton Square, N.J., assignors to Radio Corporation of America, a corporation of Delaware Filed Dec. 26, 1957, Ser. No. 705,403

6 Claims. (Cl. 250—83.3)

The present invention relates to improved means and methods for the detection and measurement of radiation.

An object of the present invention is to provide an improved radiation detector which is simple, cheap and rugged.

Another object of the invention is to provide a detection instrument which can detect not only charged particles such as alpha and beta particles but also uncharged high energy particles such as neutrons and the like.

In previous investigations relating to semiconductor radioactive batteries, it was found that decreases in battery output could be attributed to damage created by radiation from the radioactive source. Energetic radiating particles such as alpha particles, electrons, and the like, damage the crystalline structure of the semiconductor by causing atoms of the crystal to be displaced from their equilibrium lattice positions. An example of such an atomic displacement is known as a "Fenkel defect"; the concentration N, per cubic centimeter of such defects depends upon the radiation flux density, and the nature of the flux (the types of particles and their energies).

When defects such as discussed above are introduced into a semiconductor, its resistivity changes and it has been suggested that radiation damage may be measured by measuring such changes. However, the minimum change in resistivity which is measurable requires the production of about $10^{15}$ defects per cubic centimeter. A change in resistivity is accordingly a relatively insensitive indication of radiation damage.

The present inventors have previously suggested a greatly improved method for measuring radioactive damage. It is described in the "Physical Review," volume 98, number 6, pages 1861-1863, June 15, 1955, and other places in the literature. In brief, the creation of defects results in a reduction of the lifetime $\tau$ of the minority carriers in a semiconductor. If the semiconductor is fabricated into a P-N junction, or other kind of barrier cell, the square of the short circuit current ($I_s$), developed when the cell is exposed to ionizing radiation, is proportional to $\tau$. A decrease in $I_s$ can very easily be measured, according to this method, when only about $10^{10}$ defects per cubic centimeter are produced. This method is accordingly five orders of magnitude more sensitive to the presence of radiation produced defects than the one employing resistivity measurements.

However, in order to obtain a reasonable reference value of $I_s$ (about 1 milliampere) it is necessary to immerse the semiconductor in a very intense radiation field. In the actual experiments described in the article above, the radiation field employed was the electron beam of a Van de Graaff generator and the beam current required to produce 1 milliampere of $I_s$ was on the order of $10^{-7}$ amperes. At voltages greater than the thresholds for radiation damage, as discussed in the article, this beam current caused a tremendous amount of radiation damage.

The realization that relatively small amounts of semiconductor radiation damage may now be detected—and detected with an extremely high degree of sensitivity, has lead to the present invention. According to this invention, a reference short circuit current $I_s$ is caused to flow in the semiconductor by means other than the radiation to be detected. For example, a junction or a barrier cell may be illuminated by a light source of moderate intensity, and on the order of tens of milliamperes of $I_s$ readily produced. If the semiconductor is a transistor, an $I_s$ of high value may be produced merely by injecting carriers at the emitter electrode. Any decrease in $I_s$ is then indicative of a decrease in $\tau$ and this, in turn, is indicative of the presence of radiation. With cheap, conventional instruments, such as low priced ammeters, for example, a decrease in $I_s$ of 5–10% can easily be detected. With higher priced instruments, a decrease in $I_s$ of 1% or less can be detected. Amounts and rates of radiation may readily be determined by measuring the reduction of $I_s$ as a function of time.

The present invention makes it possible for the first time to have a practical radiation detection instrument which depends upon the principle that damage caused by radiation is a very sensitive indication of the presence of radiation. The system is now practical because the means providing the reference short circuit (the source of light, in the case of a photovoltaic cell, and the current source connected to the emitter electrode, in the case of a three terminal barrier junction device such as a transistor) requires only an extremely small amount of power. With this small amount of power, it is possible to obtain a relatively high reference $I_s$, which is easily measured by means of a simple milliammeter. The high value of $I_s$ makes it very simple to determine any decrease in $I_s$. Another important advantage is that the reference $I_s$ is produced without creating radiation damage. Another is that the semiconductor can be recalibrated after it has been damaged extensively and can continue to be used. Another is that the detection circuit is very simple, is cheap and is rugged. Finally, the present circuit is suitable for the detection of uncharged particles such as neutrons, for example, which were previously detectable only by indirect means.

The invention will be described in greater detail by reference to the following description taken in connection with the accompanying drawing in which.

Figure 1:
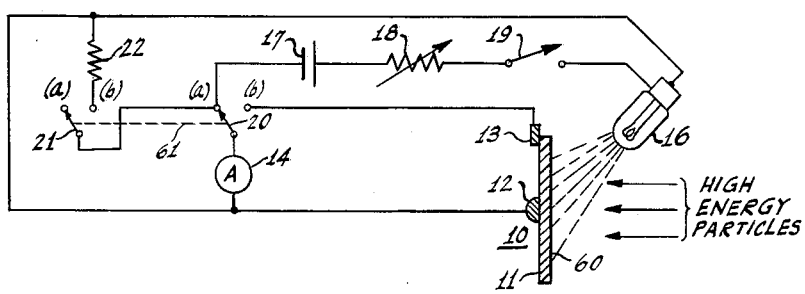
Fig. 1 is a schematic circuit diagram of one form of the invention.

Referring to Fig. 1, the photovoltaic cell 10 may be a diode of the rectifying alloy junction type. It may comprise a wafer 11 of N-type germanium or silicon, for example, having a P-type electrode 12 of indium or aluminum alloyed to one of the surface thereof so as to establish a P-N rectifying junction. It is advantageous to use a semiconductor of relatively low atomic weight, such as silicon, as it is subject to greater radiation damage than a higher weight material would be under the same conditions. The semiconductor wafer may be a few mils in thickness. An ohmic connection may be made to one end of wafer 11 by soldering a nickel tab 13 (or ring) thereto. Preferably, the junction electrode 12 and the ohmic connection 13 are located on the same surface of the wafer so that the entire opposite surface may be available for exposure to light and the radiation to be detected.

A source of light, shown as lamp 16, is positioned to illuminate surface 60 of the diode. The lamp is connected in series with a battery 17, an adjustable resistor 18, and a switch 19. As will be explained in more detail later, the series circuit may be completed either through a switch 21 and resistor 22 or a switch 20 and ammeter 14. The two switches 20 and 21 are preferably ganged, as shown by the dash line 61 between them. Resistor 22 is preferably of the same value as the internal resistance of the ammeter.

In operation, switches 20 and 21 are initially in position $a$. Switch 19 is then closed and lamp 16 lights. Adjustable resistor 18 is then varied to obtain a light output of reference intensity. This intensity may be measured in terms of current flow through ammeter 14.

Switches 20 and 21 are now thrown to position $b$, and this throws resistor 22 into the lamp circuit and ammeter 14 into the diode circuit. The light remains at the same intensity since resistor 22 is matched to the resistance of ammeter 14. The ammeter now reads the short circuit current output of the diode. The short circuit current $I_s$ is proportional to the square root of the lifetime $\tau$ of the minority carriers injected by the light source 16. Any reduction in $I_s$ (provided all other parameters, such as light intensity, for example, remain fixed) is indicative of radiation damage produced in the semiconductor, and this in turn, is indicative of radiation striking the semiconductor. The extent of the decrease of $I_s$ in a predetermined interval of time is a measure of the amount of radiation striking the semiconductor diode.

In normal operation, in order to conserve battery life, after the circuit of Fig. 1 is initially calibrated, light 16 may be turned off. When a reading is to be made, switch 19 is closed. The switches 20, 21 are thrown to position $a$ and resistor 18 adjusted, if necessary, to insure that the light intensity is at the reference value. The switches are then thrown to position $b$ and any change in $I_s$ noted.

After a certain amount of use, there may be so much radiation damage produced in diode 10 that its current $I_s$ is at a value too low conveniently to be detected. This may be compensated for by adjusting resistor 18 to a lower value thereby increasing the light current and light intensity, and returning $I_s$ to its original reference level.

Since $I_s \propto \tau^{1/2}$ and $\tau \propto 1/N$, ammeter 14 may be calibrated to read $N$ directly by using a hyperbolic scale factor.

It has been mentioned previously that the present method can determine a decrease in current due to the production of about $10^{10}$ defects per cubic centimeter. This figure is based on the use of a cheap milliammeter and a conventionally produced, transistor-quality semiconductor. The latter normally initially has about $10^{11}$ defects per cubic centimeter in the crystal structure due to limitations in present manufacturing processes. A brief mathematical analysis follows:

$$I_s^2 = K\tau \quad (1)$$

where $I_s$ = short circuit current.
$K$ = a constant.
$\tau$ = carrier lifetime.

$$\frac{1}{\tau} = \frac{1}{\tau_0} + N_B t_B \alpha \quad (2)$$

where $\tau_0$ = the initial carrier lifetime.
$N_B$ = the number of bombarding particles per second.
$\alpha$ = a constant.
$t_B$ = bombardment time, in seconds.

$$\frac{1}{\tau_0} = N_{R_0} \alpha_0 \quad (3)$$

where $N_{R_0}$ = the number of recombination centers in the material initially.
$\alpha_0$ = a constant.

Dividing (2) by $K$ and transposing gives:

$$\frac{1}{K\tau} - \frac{1}{K\tau_0} = \frac{N_B \alpha t_B}{K} \quad (4)$$

Substituting (1) in (4) gives:

$$\frac{1}{I_s^2} - \frac{1}{I_{s_0}^2} = \frac{N_B \alpha t_B}{K} \quad (5)$$

where $I_{s_0}$ = initial short current

Suppose the ammeter in use is relatively insensitive and can detect a change in current of only 10%. In this case $$I_s^2 = (.9 I_{s_0})^2 \cong 0.8 I_{s_0}^2 \quad (6)$$

Substituting (6) in (5) gives:

$$\frac{1}{0.8 I_{s_0}^2} - \frac{1}{I_{s_0}^2} = \frac{N_B \alpha t_B}{K}$$

$$\frac{1.25 - 1}{I_{s_0}^2} = \frac{0.25}{I_{s_0}^2} = \frac{N_B \alpha t_B}{K}$$

$$0.25 = \frac{N_B \alpha t_B}{K} I_{s_0}^2 \quad (7)$$

Substituting $K\tau_0$ for $I_{s_0}$ gives:

$$0.25 = N_B \cdot \alpha \cdot t_B \cdot \tau_0 = \frac{N_B \cdot \alpha \cdot t_B}{N_{R_0} \alpha_0} \quad (8)$$

In other words, a decrease in current of 10% indicates an increase in number of defects $$\left( \text{the ratio } \frac{N_B \alpha t_B}{N_{R_0} \alpha_0} = \frac{\text{newly created defects}}{\text{original number of defects}} \right) \text{ of } 25\%$$

If there were $10^{11}$ defects per cubic centimeter initially, a 10% decrease in $I_s$ indicates a $0.25 \times 10^{11} = 2.5 \times 10^{10}$ increase in the number of defects per cubic centimeter. If the milliammeter is more sensitive, a smaller change in the number of defects can be detected. For example, for the same material, with a milliammeter sensitive to 5%, $1.25 \times 10^{10}$ radiation produced defects per cubic centimeter can be detected; with one sensitive to 1%, $2.5 \times 10^9$ of such defects per cubic centimeter can be detected. With even more sensitive instruments, such as bridges, for example, changes in the number of defects per cubic centimeter on the order of 2% or less can easily be detected.

Figure 2:
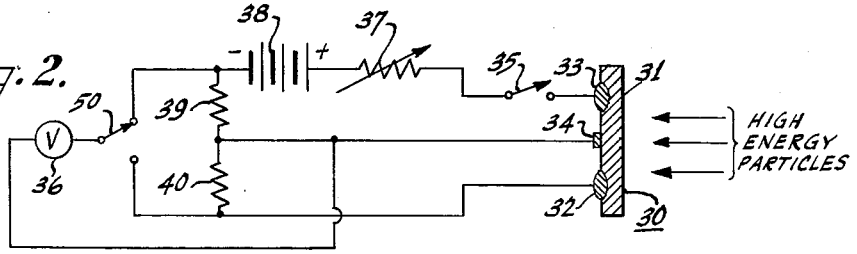
Fig. 2 is a schematic diagram of another form of the present invention.

Referring to Fig. 2, semiconductor device 30 comprises a body 31 of N-type semiconductive material such as germanium or silicon or the like. P-type rectifying electrodes 32 and 33, which may be of the alloy junction type, are in contact with one of the surfaces of the semiconductive body 31 so as to establish a rectifying barrier or junction therewith. The rectifying electrodes 32 and 33 may comprise bodies of indium, for example, which are alloyed and fused to the semiconductive body 31. In between the P-type rectifying electrodes 32 and 33, an ohmic connection 34 is made to the semiconductive body 31 by soldering a metallic tab of nickel, for example, thereto.

In the circuit arrangement shown in Fig. 2, it is assumed, for purposes of explanation, that the minority charge carriers are to be injected into the semiconductor body 31 by means of the rectifying emitter electrode 33 and collected by the rectifying collector electrode 32. A switch 35, resistor 37, and battery 38 are connected in series with emitter electrode 33. They perform functions similar to those performed by the analogous elements of the embodiment of Fig. 1. A switch 50 connects the voltmeter 36 into either the emitter-base circuit or the collector-base circuit, at will. The voltmeter may thus be connected to measure the voltages across resistors 39 and 40. These voltages are indicative of the emitter-to-base current and the base-to-collector current, respectively. Resistors 39 and 40 are of low value, preferably, on the order of 10 ohms or less.

The number of charge carriers collected by the collector electrode 32 is dependent upon the injector current and the lifetime of the carriers. With constant injector current and the lifetime of the carriers fixed, the collector current $I_s$ remains constant. However, when the semiconductor device is exposed to radiation of high energy particles, these penetrate and damage the semiconductor body 31, and the lifetime $\tau$ of the minority carriers is correspondingly reduced. Since the collector current $I_s$ is proportional to $\tau^{1/2}$, any decrease in $\tau$ means decreased $I_s$. (The mathematical analysis is the same as the one previously given.)

In operation, resistor 37 is initially adjusted to provide a reference emitter current and the collector current $I_s$ is noted. A decrease in $I_s$ indicates the presence of damage creating radiation. The emitter current may be readily checked to insure that it remains constant. If, after prolonged exposure, the collector current $I_s$ drops to a value too low to be easily observable, a new and higher reference emitter current can be established readily by readjustment of resistor 37.

Figure 3:
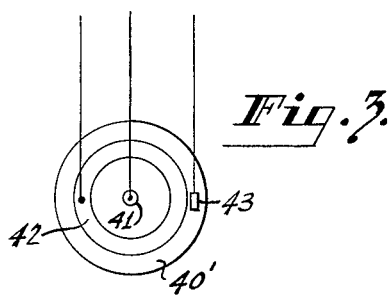
Fig. 3 is a drawing of a cell which is especially useful in the circuit of Fig. 2.

Fig. 3 shows a preferred type of semiconductor construction which may be used in the circuit of Fig. 2. The various electrodes are symmetrically arranged with the emitter electrode 41 at the center surrounded by a ring-shaped base electrode 42. The collector tab 43 is beyond the base electrode. The wafer is indicated at 40' and may be formed of silicon, for example.

While the invention has been described in connection with specific types of semiconductor devices, these are meant merely to be illustrative rather than limiting. Thus, in the case of the transistor embodiment of the invention, the transistor can be of P–N–P, N–P–N or other type. The same holds for the photovoltaic cell embodiment shown in Fig. 1. In both cases, it is merely necessary that the semiconductor be subject to radiation damage by the radiation to be detected and/or measured.

What is claimed is:

1. A radiation detection instrument comprising, a semiconductor rectifying barrier device of the type subject to radiation damage by the radiation to be detected; means other than the radiation to be detected or injecting carriers into said semiconductor so as to cause current to flow therethrough; and means for detecting a decrease in said current flow caused by a decrease due to incident radiation damage in the lifetime of said carriers.

2. A radiation detection instrument comprising, a semiconductor rectifying barrier device of the type subject to radiation damage by the radiation to be detected and producing a flow of current in response to other illumination; means for illuminating said semiconductor by means other than the radiation to be detected and thereby causing current flow therethrough; and means for detecting a decrease in said current flow caused by a decrease due to incident radiation damage in the lifetime of the minority carriers in the semiconductor.

3. A radiation detection instrument as set forth in claim 2 and further including means for adjusting the intensity of said other illumination.

4. A radiation detection instrument comprising, a semiconductor photovoltaic cell of the type subject to radiation damage by the radiation to be detected; an illuminating element; connections for a source of voltage; an adjustable resistor in series with said connections and said illuminating element, whereby the amount of current flow through said illuminating element may be controlled so as to control the intensity of the light emitted thereby; a current measuring instrument; and switch means for permitting said instrument to be connected across said semiconductor or effectively in series with said illuminating element at will, whereby the current applied to said illuminating element may be adjusted to a constant value, and any change due incident radiation damage in the short-circuit current through said semiconductor may be detected.

5. A radiation detection instrument comprising, a semiconductor junction device having an emitter electrode and a collector electrode, said device being one of the type which is subject to radiation damage by the radiation to be detected; means in series with said emitter electrode for injecting carriers into said device at said emitter electrode, whereby a given collector current is obtained; and means for detecting any decrease in said collector current caused by a decrease due to incident radiation damage in the lifetime of said carriers.

6. A radiation detection instrument as set forth in claim 5 in which said device includes a base electrode, said means for measuring collector current comprising a meter, and means for connecting said meter, at will, in the collector-to-base circuit or the emitter-to-base circuit of said transistor; and further including an adjustable impedance element in said emitter circuit.

References Cited in the file of this patent

UNITED STATES PATENTS

| 2,604,596 | Ahearn | July 22, 1952 |
| 2,706,792 | Jacobs | Apr. 19, 1955 |

OTHER REFERENCES

Vavilov et al.: J. Exptl. Theoret. Phys. (U.S.S.R.) 32, 702–705, April 1957; translation appears in Soviet Physics JETP, vol. 5, No. 4, November 1957.

UNITED STATES PATENT OFFICE
CERTIFICATION OF CORRECTION

Patent No. 2,975,286                        March 14, 1961

Paul Rappaport et al.

It is hereby certified that error appears in the above numbered patent requiring correction and that the said Letters Patent should read as corrected below.

Column 1, line 32, for "a "Fenkel defect"; the" read -- a "Frenkel defect"; the --; column 2, line 23, after "circuit" insert -- current --; column 4, line 20 for "$I_{so}$" read -- $I_{so}^2$ --; column 5, line 38, for "or" read -- for --; column 6, line 19, after "due" insert -- to --.

Signed and sealed this 8th day of August 1961.

(SEAL)
Attest:

ERNEST W. SWIDER
Attesting Officer

DAVID L. LADD
Commissioner of Patents